United States Patent
Zhang

(10) Patent No.: US 12,260,519 B2
(45) Date of Patent: Mar. 25, 2025

(54) SATURATION ENHANCEMENT METHOD AND DEVICE, AND COMPUTER READABLE STORAGE MEDIUM

(71) Applicant: SHENZHEN TCL NEW TECHNOLOGY CO., LTD., Guangdong (CN)

(72) Inventor: Xiaodong Zhang, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 378 days.

(21) Appl. No.: 17/754,256

(22) PCT Filed: Aug. 27, 2020

(86) PCT No.: PCT/CN2020/111630
§ 371 (c)(1),
(2) Date: Mar. 29, 2022

(87) PCT Pub. No.: WO2021/063135
PCT Pub. Date: Apr. 8, 2021

(65) Prior Publication Data
US 2022/0358623 A1   Nov. 10, 2022

(30) Foreign Application Priority Data
Sep. 30, 2019   (CN) .......................... 201910948636.1

(51) Int. Cl.
*G06T 5/00*       (2024.01)
(52) U.S. Cl.
CPC ...... *G06T 5/00* (2013.01); *G06T 2207/10024* (2013.01)

(58) Field of Classification Search
CPC ... G06T 5/00; G06T 2207/10024; H04N 9/68; H04N 9/69; H04N 9/77; H04N 9/67
See application file for complete search history.

(56) References Cited

U.S. PATENT DOCUMENTS

| 6,014,457 A | 1/2000 | Kubo |
| 2009/0059326 A1* | 3/2009 | Hong .................... G06T 11/001 358/518 |

(Continued)

FOREIGN PATENT DOCUMENTS

| CN | 101009851 A | 8/2007 |
| CN | 101115211 A | 1/2008 |

(Continued)

OTHER PUBLICATIONS

Chinese Office Action issued in corresponding Chinese Patent Application No. 201910948636.1 dated Feb. 10, 2021, pp. 1-6.

(Continued)

*Primary Examiner* — Bobbak Safaipour
*Assistant Examiner* — Michael Kim Maiden
(74) *Attorney, Agent, or Firm* — PV IP PC; Wei Te Chung

(57) ABSTRACT

Disclosed is a saturation enhancement method, the method comprising: performing color space conversion on an input image to obtain color data of color conversion; performing saturation expansion on the color data of the color conversion to obtain expanded color data; and performing Gamma preprocessing on the expanded color data to obtain processed color data. Also disclosed are a saturation enhancement device and a computer readable storage medium.

20 Claims, 3 Drawing Sheets

(56) References Cited

U.S. PATENT DOCUMENTS

| | | | |
|---|---|---|---|
| 2011/0013208 A1* | 1/2011 | Bhaskaran | H04N 1/6058 358/1.9 |
| 2015/0110398 A1* | 4/2015 | Totsuka | G06T 11/001 382/167 |
| 2015/0221281 A1* | 8/2015 | Bosco | G09G 5/026 345/590 |
| 2015/0228090 A1 | 8/2015 | Okawa et al. | |
| 2018/0077395 A1 | 3/2018 | Kitajima | |

FOREIGN PATENT DOCUMENTS

| | | |
|---|---|---|
| CN | 101287130 A | 10/2008 |
| CN | 101794565 A | 8/2010 |
| CN | 102611897 A | 7/2012 |
| CN | 108961192 A | 12/2018 |
| CN | 111147837 A | 5/2020 |

OTHER PUBLICATIONS

International Search Report in International application No. PCT/CN2020/111630, mailed on Nov. 27, 2020.
Written Opinion of the International Search Authority in international application No. PCT/CN2020/111630, mailed on Nov. 27, 2020.
European Search Report in European application No. 20872656.2, mailed on Aug. 7, 2023.
Various Authors: "'sRGB", Wikipedia, Sep. 14, 2019 (Sep. 14, 2019), XP093067383.
Various Authors: "CIELUV", Wikipedia, Jul. 15, 2019 (Jul. 15, 2019), XP093067378.

* cited by examiner

SATURATION ENHANCEMENT METHOD AND DEVICE, AND COMPUTER READABLE STORAGE MEDIUM

CROSS-REFERENCE TO RELATED APPLICATION

This application is a US national phase application based upon an International Application No. PCT/CN2020/111630, filed on Aug. 27, 2020, which claims the priority of Chinese Patent Application No. 201910948636.1, entitled "SATURATION ENHANCEMENT METHOD AND DEVICE, AND COMPUTER READABLE STORAGE MEDIUM", filed on Sep. 30, 2019, the disclosure of which is incorporated herein by reference in its entirety.

FIELD OF THE DISCLOSURE

The present disclosure relates to an image processing technology, and more specifically, to a saturation enhancement method and a device, and a computer readable storage medium.

BACKGROUND

At present, color gamut in transmission of radio and television systems includes BT601 (standard definition) and BT709 (high definition), etc. The color gamut that can be displayed is continuously expanding with development of display technology. The color gamut of a display is different, and therefore color reproduction ability is also different. Compared with a display with lower color gamut, color saturation of a display with higher color gamut is higher, and a displayed image looks more vivid, and therefore more in line with aesthetics of ordinary people.

Therefore, in order to enhance the user's viewing experience, under the premise that image hue and brightness remain basically unchanged, enhancing the color saturation of the image becomes an urgent technical problem to be solved.

SUMMARY

Technical Solution

It is an objective of the present disclosure to provide a saturation enhancement method and a device, and a computer readable storage medium, which aims at enhancing color saturation of an image.

To attain the above object, in a first aspect of the present disclosure, there is provided a saturation enhancement method, comprising:
  converting a color space of an input image to obtain color data of color conversion;
  expanding color saturation on the color data of the color conversion to obtain an expanded color data; and
  performing a gamma-based preprocess on the expanded color data to obtain an processed color data.

In one embodiment, the step of converting the color space of the input image to obtain the color data of color conversion comprises:
  acquiring RGB data of each pixel in an RGB space of the input image;
  normalizing the RGB data and performing gamma correction on the RGB data normalized to obtain linear RGB data of the input image; and
  converting the linear RGB data of the input image into LCH data in an LCH space.

In one embodiment, the step of normalizing the RGB data and performing gamma correction on the RGB data normalized to obtain linear RGB data of the input image comprises:
  normalizing the RGB data according to a number of bits of the RGB data; and
  performing gamma correction on the RGB data normalized according to a preset gamma value to obtain the linear RGB data of the input image.

In one embodiment, the step of converting the linear RGB data of the input image into the LCH data in the LCH space comprises:
  converting the linear RGB data of the input image into XYZ data in an XYZ space;
  converting the XYZ data into Luv data in a Luv space; and
  converting the Luv data into the LCH data in the LCH space.

In one embodiment, the step of expanding color saturation on the color data of the color conversion to obtain the expanded color data comprises:
  determining whether color saturation in the LCH data is greater than a preset threshold;
  if determining that the color saturation in the LCH data is greater than the preset threshold, expanding the color saturation of the input image non-linearly according to the Bézier curve;
  if determining that the color saturation in the LCH data is not greater than the preset threshold, expanding the color saturation of the input image linearly; and
  acquiring the color saturation in the LCH data after expanding color saturation.

In one embodiment, the color saturation in the LCH data after expanding color saturation is acquired by the following formulas:

$$c_{out} = \begin{cases} \dfrac{kc_{out}}{kc_{in}} c_{in}, & 0 \le c_{in} \le kc_{in} \\ kc_{out} + (1 - kc_{out})B_N\left(\dfrac{c_{in} - kc_{in}}{1 - kc_{in}}\right), & kc_{in} < c_{in} \le 1 \end{cases} ;$$

$$B_N = \sum_{i=0}^{N} \binom{N}{k} t^i (1-t)^{N-i} P_i;$$

wherein $kc_{in}$ is a preset threshold, k is a coefficient of linear expansion, $k \ge 1$, $B_N$ is the Bézier curve, $P_i$ is a point on the Bézier curve, $P_i = (P_0, P_1, P_2, \ldots, P_N)$, i is an order of the Bézier curve, i is a natural number, $P_0, P_1, P_2, \ldots, P_N$ are determined by a color saturation distribution of an image.

In one embodiment, before the step of performing the gamma-based preprocess on the expanded color data to obtain the processed color data, the method further comprises:
  converting the LCH data after expanding color saturation into corresponding Luv data in the Luv space;
  converting the corresponding Luv data after expanding color saturation into corresponding XYZ data in the XYZ space; and
  converting the corresponding XYZ data after expanding color saturation into corresponding linear RGB data in the RGB space.

In one embodiment, the step of performing the gamma-based preprocess on the expanded color data to obtain the processed color data comprises:

converting the corresponding linear RGB data after expanding color saturation into corresponding non-linear RGB data by gamma presetting; and displaying the corresponding non-linear RGB data on a display after expanding color saturation.

In addition, to attain the above objective, in a second aspect of the present disclosure, there is provided a saturation enhancement device, comprising: a memory, a processor, and a program for enhancing color saturation stored on a memory and executed by the processor, when the program is executed by the processor, the steps of any of the above-described methods for enhancing color saturation are implemented.

In addition, to attain the above objective, in a third aspect of the present disclosure, there is provided a computer readable storage medium on which the program for enhancing color saturation is stored, and when the program for enhancing color saturation is executed by the processor, the steps of any of the above-described methods for enhancing color saturation are implemented.

In the present disclosure, the method comprises: converting a color space of an input image to obtain color data of color conversion; expanding color saturation on the color data of the color conversion to obtain an expanded color data; and performing a gamma-based preprocess on the expanded color data to obtain a processed color data. By the above-mentioned method, the color space of the input image is converted, and the color data is saturated in the converted color space, so that the color saturation of the input image is enhanced in the case of basically unchanged hue and brightness of the image, and the image looks more vivid, thereby improving the user's viewing experience.

Implementation, functional characteristics, and advantages of the present application will be further described with reference to accompanying drawings in conjunction with embodiment.

DETAILED DESCRIPTION

It is understood that both the foregoing general description and the following detailed description are exemplary and explanatory only and are not restrictive of the present disclosure.

Figure 1:
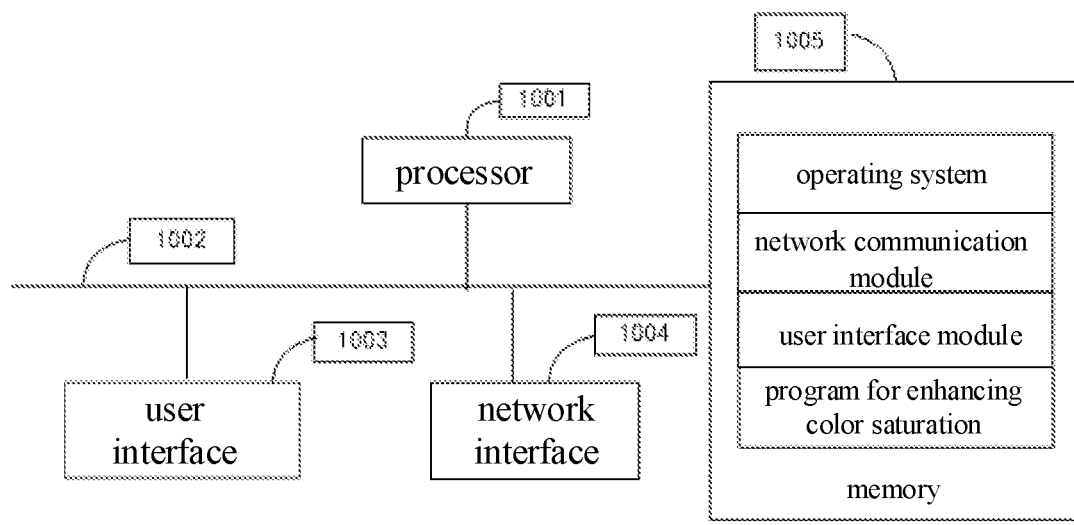
FIG. 1 is a schematic structural diagram of an apparatus involved in a hardware operating environment in one embodiment of the present disclosure.

As shown in FIG. 1, FIG. 1 is a schematic structural diagram of an apparatus involved a hardware environment in one embodiment of the present disclosure.

An apparatus in the embodiment of the present disclosure may be a smart TV, or a smart phone, a tablet computer, a PC, an MP3 (Moving Picture Experts Group Audio Layer III) player, an MP4 (Moving Picture Experts Group Audio IV) player, a portable computer, and other apparatuses with display functions.

As shown in FIG. 1, the apparatus may include: a processor 1001, such as a CPU, a communication bus 1002, a user interface 1003, a network interface 1004, and a memory 1005. Wherein the communication bus 1002 is used for communication between these components. The user interface 1003 may include a display, an input unit such as a keyboard. Optionally, the user interface 1003 may further include a standard wired interface and a wireless interface. Optionally, the network interface 1004 may include a standard wired interface and a wireless interface (for example, a Wi-Fi interface). The memory 1005 may be a high-speed RAM memory, or may be a non-volatile memory, such as a magnetic disk. Optionally, the memory 1005 may be a storage device independent of the aforementioned processor 1001.

Optionally, the apparatus may further include a camera, an RF (Radio Frequency) circuit, a sensor, an audio circuit, a Wi-Fi module, and the like. Wherein the sensor is such as a light sensor, a motion sensor, and other sensors. Specifically, the light sensor may include an ambient light sensor and a proximity sensor, wherein brightness of the display may be adjusted by the ambient light sensor according to brightness of ambient light, and the display and/or the backlight may be turned off by the proximity sensor when the mobile device is near a user's ear. As a kind of motion sensors, a gravitational acceleration sensor may determine the magnitude of acceleration in all directions (usually three axes), and when stationary, the gravitational acceleration sensor may determine the magnitude and direction of gravity, which are used in applications (such as horizontal and vertical screen switching, related games, magnetometer attitude calibration) for recognizing one or more postures of a mobile device, and functions (such as pedometer, tapping) related to vibration recognition, etc. Certainly, the mobile device may also be equipped with a gyroscope, a barometer, a hygrometer, a thermometer, an infrared sensor and other sensors, which are not further described in detail here.

It is understood that for a person skilled in the art that the structure of the apparatus shown in FIG. 1 does not constitute a limitation to the apparatus. The apparatus may include more or less components than the ones shown in drawings, or combine some components, or components arranged in various configurations.

As shown in FIG. 1, the memory 1005 as a computer storage medium may include an operating system, a network communication module, a user interface module, and a program for enhancing color saturation.

The network interface 1004 of the apparatus shown in FIG. 1 is configured to connect to a backend server and perform data communication with the backend server. The user interface 1003 is configured to connect to a client side and perform data communication with the client side. The processor 1001 may invoke a program for enhancing color saturation stored in a memory 1005 and implement the following operations:

converting a color space of an input image to obtain color data of color conversion;

expanding color saturation on the color data of the color conversion to obtain an expanded color data;

performing a gamma-based preprocess on the expanded color data to obtain a processed color data.

Furthermore, the processor 1001 may invoke the program for enhancing color saturation stored in the memory 1005, and further implement following operations:

acquiring RGB data of each pixel in an RGB space of the input image;

normalizing the RGB data and performing gamma correction on a normalized RGB data to obtain linear RGB data of the input image;

converting the linear RGB data of the input image into LCH data in an LCH space.

Furthermore, the processor 1001 may invoke the program for enhancing color saturation stored in the memory 1005, and further implement following operations:

normalizing the RGB data according to a number of bits of the RGB data;

performing gamma correction on the normalized RGB data according to a preset gamma value to obtain the linear RGB data of the input image.

Furthermore, the processor 1001 may invoke the program for enhancing color saturation stored in the memory 1005, and further implement following operations:

converting the linear RGB data of the input image into XYZ data in an XYZ space;

converting the XYZ data into Luv data in a Luv space; and converting the Luv data into LCH data in the LCH space.

Furthermore, the processor 1001 may invoke the program for enhancing color saturation stored in the memory 1005, and further implement following operations:

determining whether color saturation in the LCH data is greater than a preset threshold;

if yes, expanding the color saturation of the input image non-linearly according to the Bézier curve;

if no, expanding the color saturation of the input image linearly;

acquiring the color saturation in the LCH data after expanding color saturation.

Furthermore, the processor 1001 may invoke the program for enhancing color saturation stored in the memory 1005, and further implement following operations:

acquiring the color saturation in the LCH data after expanding color saturation by the following formulas:

$$c_{out} = \begin{cases} \dfrac{kc_{out}}{kc_{in}} c_{in}, & 0 \le c_{in} \le kc_{in} \\ kc_{out} + (1 - kc_{out})B_N\left(\dfrac{c_{in} - kc_{in}}{1 - kc_{in}}\right), & kc_{in} < c_{in} \le 1 \end{cases};$$

$$B_N = \sum_{i=0}^{N} \binom{N}{k} t^i (1-t)^{N-i} P_i;$$

wherein $kc_{in}$ a preset threshold, k is a coefficient of linear expansion, k≥1, $B_N$ is the Bézier curve, $P_i$ is a point on the Bézier curve, $P_i = (P_0, P_1, P_2, \ldots, P_N)$, i is an order of the Bézier curve, i is a natural number, $P_0$, $P_1$, $P_2$, ..., $P_N$ are determined by a color saturation distribution of an image.

Furthermore, the processor 1001 may invoke the program for enhancing color saturation stored in the memory 1005, and further implement the following operations:

converting the LCH data after expanding color saturation into corresponding Luv data in the Luv space;

converting the corresponding Luv data after expanding color saturation into corresponding XYZ data in the XYZ space;

converting the corresponding XYZ data after expanding color saturation into corresponding linear RGB data in the RGB space.

Furthermore, the processor 1001 may invoke the program for enhancing color saturation stored in the memory 1005, and further implement the following operations:

converting the corresponding linear RGB data after expanding color saturation into corresponding non-linear RGB data by gamma presetting; and displaying the corresponding non-linear RGB data on a display after expanding color saturation.

The specific embodiments of the apparatus for enhancing color saturation of the present disclosure are basically same as following embodiments of the method for enhancing color saturation, which are not further described in detail here.

Figure 2:
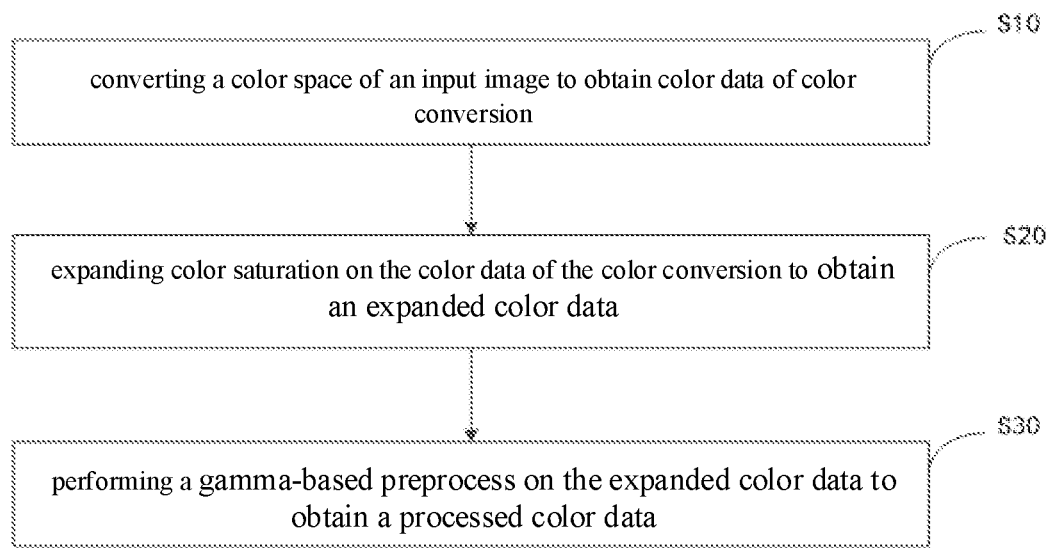
FIG. 2 is a schematic flowchart of a first embodiment of a saturation enhancement method of the present disclosure.

Referring to FIG. 2, FIG. 2 is a schematic flowchart of a first embodiment of the saturation enhancement method of the present disclosure. The saturation enhancement method comprises the steps:

Step S10, converting a color space of an input image to obtain color data of color conversion.

The apparatus in the embodiment of the present disclosure may be a smart TV, or a smart phone, a tablet computer, a PC, an MP3 (Moving Picture Experts Group Audio Layer III) player, and an MP4 (Moving Picture Experts Group Audio IV) player, portable computers, and other apparatuses with display functions. For convenience of description, following embodiments will take a smart TV as an example. An input image is required to be obtained when the smart TV is turned on, a corresponding channel of the image information currently displayed on the display is required to be determined in order to acquire a source signal in the channel and then retrieve image information in video information from the source signal. Certainly, as another implementation, the image information may also be obtained through an image processing circuit in the smart TV. It should be noted that the RGB data of the input image may be non-linear RGB data or linear RGB data. In a case when non-linear RGB data is acquired, the non-linear RGB data is required to be normalized, and gamma correction is to be performed on the normalized RGB data to obtain linear RGB data of the input image, and then the linear RGB data of the input image is to be converted into LCH data in the LCH space. However, in a case when linear RGB data is directly acquired, the linear RGB data of the input image is directly converted into LCH data in the LCH space without implementing steps of normalization and gamma correction.

Since there is not any direct conversion formula between RGB data and LCH data, a channel of an XYZ space is used as an intermediate layer. In the process of converting the linear RGB data of the input image into the LCH data of the LCH space, the linear RGB data is firstly required to be converted to the XYZ space, and then the XYZ space is converted into the LCH space in order to obtain the corresponding LCH data, wherein value of L indicates lightness, value of C indicates chroma, and value of H indicates hue angle.

Step S20, expanding color saturation on the color data of the color conversion to obtain the expanded color data.

The color saturation of each pixel is to be obtained by converting the linear RGB data of the input image into the LCH data of the LCH space. Compared the color saturation of each pixel with a preset threshold, the color saturation of the pixel is linearly expanded if the color saturation of the pixel does not exceed the preset threshold, and the color saturation of the pixel is non-linearly expanded if the color saturation of the pixel exceeds the preset threshold. Specifically, following formulas are used to linearly expand the color saturation that does not exceed the preset threshold in the image in the LCH space and to non-linearly expand the color saturation that exceeds the preset threshold in the image in the LCH space, so as to obtain the input image after expanding color saturation.

$$c_{out} = \begin{cases} \dfrac{kc_{out}}{kc_{in}} c_{in}, & 0 \leq c_{in} \leq kc_{in} \\ kc_{out} + (1 - kc_{out})B_N\left(\dfrac{c_{in} - kc_{in}}{1 - kc_{in}}\right), & kc_{in} < c_{in} \leq 1 \end{cases};$$

$$B_N = \sum_{i=0}^{N} \binom{N}{k} t^i (1-t)^{N-i} P_i;$$

wherein $kc_{in}$ is a preset threshold, k is a coefficient of linear expansion, k≥1, $B_N$ is the Bézier curve, $P_i$ is a point on the Bézier curve, $P_i=(P_0, P_1, P_2, \ldots, P_N)$, i is an order of the Bézier curve, i is a natural number, $P_0, P_1, P_2, \ldots, P_N$ are determined by a color saturation distribution of the image.

It should be noted that the preset threshold value $kc_{in}$ may be 0.3, 0.4 or 0.5, or set according to an actual situation, which is not specifically limited in this embodiment.

Figure 3:
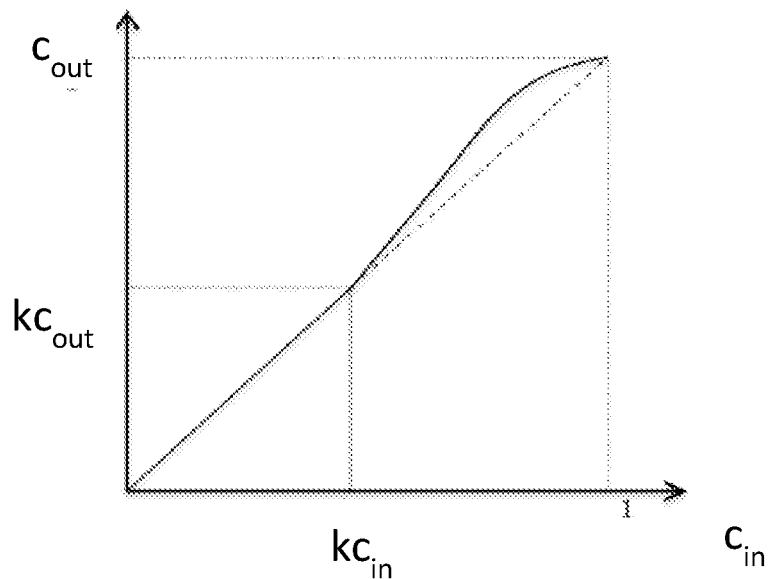
FIG. 3 is a schematic diagram of a correspondence between $c_{in}$ before expanding color saturation and $c_{out}$ after expanding color saturation in an LCH space.

According to the above-mentioned formulas, the correspondence between $c_{in}$ before expanding color saturation and $c_{out}$ after expanding color saturation in the LCH space is shown in FIG. 3. If color saturation of a certain pixel does not exceed the threshold $kc_{in}$, it represents that the color saturation of the pixel is lower and is required to be linearly expanded. Here, if the value of k is greater than 1, it represents that the color saturation is linearly expanded. If the value of k is equal to 1, it represents that the color saturation remains unchanged. However, if color saturation of a certain pixel exceeds the threshold $kc_{in}$, the value of the pixel after non-linearly expanding color saturation is calculated according to the Bézier curve $B_N$. Specifically, the color saturation of each pixel in the input image is divided into different levels according to different gradients, and each level is defined as a point $P_i$ on the Bézier curve. For example, when the preset threshold is 0.4, all pixels with color saturation in the range of 0.4 to 0.5 are taken as $P_1$, and all pixels with color saturation in the range of 0.5 to 0.6 are taken as $P_2$, and so on, so as to obtain the point $P_i$ of the entire input image and then calculate the Bézier curve $B_N$.

Step S30, performing a gamma-based preprocess on the expanded color data to obtain the processed color data.

The input image after expanding color saturation is required to be converted from the LCH space into the RGB space, so as to be displayed on the display. Specifically, there is not any direct conversion formula between LCH data and RGB data, so a channel of an XYZ space is used as an intermediate layer in the process of converting the input image after expanding color saturation from the LCH space into the RGB space. The input image after expanding color saturation is converted from the LCH space into the RGB space, namely, the input image after expanding color saturation is converted from the LCH space into the XYZ space, and then the XYZ space is converted into the RGB space, so as to obtain the RGB data after expanding color saturation. If the RGB data is linear RGB data, the expanded linear RGB data is required to be converted into expanded non-linear RGB data by gamma presetting, wherein value of R indicates red, value of G indicates green, and value of B indicates blue. If the RGB data is non-linear RGB data, the non-linear RGB data is directly displayed.

In this embodiment, the expanded color data is obtained by converting a color space of the input image and expanding color saturation on the color data of the color conversion, so that the color saturation of the input image is enhanced in the case of basically unchanged hue and brightness of the image, and the image looks more vivid, thereby improving the user's viewing experience.

Figure 4:
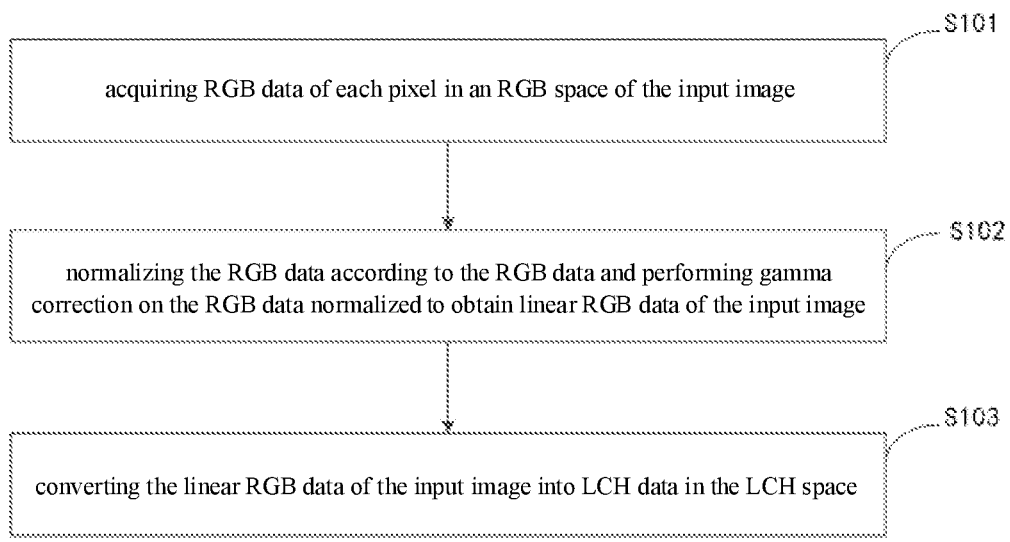
FIG. 4 is a detailed flow schematic diagram of step of converting a color space of an input image in FIG. 2 to obtain color data of color conversion.

Furthermore, referring to FIG. 4, FIG. 4 is a detailed flow schematic diagram of the step of converting a color space of an input image to obtain color data of color conversion in FIG. 2. Based on the embodiment shown in FIG. 2, step of converting the color space of an input image to obtain color data of color conversion may include:

Step S101, acquiring RGB data of each pixel in an RGB space of the input image.

When the smart TV is turned on, a corresponding channel of the image information currently displayed on the display is required to be determined to acquire a source signal in the channel, and then image information in video information is retrieved from the source signal, so that the RGB data is obtained from the image information. Certainly, as another implementation, the image information may also be obtained through an image processing circuit in the smart TV, and then the RGB data is retrieved from the image information. It should be noted that the RGB data is non-linear RGB data or linear RGB data. If non-linear RGB data corresponding to the input image is obtained, then steps S102 and S103 are executed. If linear RGB data corresponding to the input image is obtained, then go directly to step S103.

Step S102, normalizing the RGB data according to the RGB data and performing gamma correction on the RGB data normalized to obtain linear RGB data of the input image.

If the acquired RGB data is non-linear RGB data, the non-linear RGB data is required to be normalized, and the gamma correction is performed thereon to obtain the linear RGB data of the input image. If the acquired data is linear RGB data, this step is skipped, and next step S103 is directly executed.

The step S102 further comprises:

Step S201, normalizing the RGB data according to the number of bits of the RGB data.

Specifically, the RGB data may be normalized by following calculation formulas:

$$R_1 = \frac{R}{2^n - 1};$$

$$G_1 = \frac{G}{2^n - 1};$$

$$B_1 = \frac{B}{2^n - 1};$$

wherein n indicates a number of bits of the RGB data, R, G, and B indicate the RGB data of the input image in the RGB space, respectively, and $R_1$, $G_1$, and $B_1$ are normalized values of R, G, and B, respectively. It should be noted that, the number of bits n of the RGB data may be 8, or may be other values than 8, such as 9, 10, etc., which is not specifically limited in this embodiment.

Step S202: performing gamma correction on the normalized RGB data according to a preset gamma value to obtain the linear RGB data of the input image.

Specifically, gamma correction may be performed on the normalized RGB data by the following formulas:

$R'=(R_1)^\gamma$;

$G'=(G_1)^\gamma$;

$B'=(B_1)^\gamma$;

wherein n indicates a number of bits of RGB data, $\gamma$ indicates a preset gamma value, $R_1$, $G_1$, and $B_1$ are the normalized values of R, G, and B, respectively, and R', G', B' are linearization values of R, G and B, respectively. It should be noted that, the number of bits n of the RGB data may be 8, or may be other values than 8, such as 9, 10, etc., which is not specifically limited in this embodiment. The preset gamma value $\gamma$ may be 2.2 or 2.4.

Step S103, converting the linear RGB data of the input image into the LCH data in the LCH space.

Since there is not any direct conversion formula between RGB data and LCH data, a channel of an XYZ space is used as an intermediate layer. In the process of converting the linear RGB data of the input image into the LCH data of the LCH space, the linear RGB data is firstly required to be converted to the XYZ space, and then the XYZ space is converted into the LCH space in order to obtain the corresponding LCH data, wherein the value of L indicates lightness, the value of C indicates chroma, and the value of H indicates hue angle.

The above-mentioned step S103 further comprises:

Step S203, converting the linear RGB data of the input image into XYZ data in the XYZ space.

Since color coordinates of the vertices (x, y) of R, G, and B of the BT709 source are (0.640, 0.330), (0.300, 0.600) and (0.150, 0.060), respectively, and the coordinates of white point (x, y) are (0.3127, 0.3290), the linear RGB data of the input image is converted into XYZ data in the XYZ space by a following formula:

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R' \\ G' \\ B' \end{bmatrix};$$

It is required to convert the XYZ space into the Luv space after converting into the XYZ space, and then the Luv space is converted into the LCH space. Here, L indicates lightness, C indicates color saturation, and H indicates hue.

Step S204, converting the XYZ data into Luv data in the Luv space.

$L_1=116(Y/Y_0)^{1/3}-16$;

$u=13L(u'-u'_0)$;

$v=13L(v'-v'_0)$;

$u'=4X/(X+15Y+3Z)$;

$v'=9Y/(X+15Y+3Z)$;

$u'_0=4X_0/(X_0+15Y_0+3Z_0)$;

$v'_0=9Y_0/(X_0+15Y_0+3Z_0)$;

wherein R', G', B' are the linear RGB data of the input image in the RGB space, respectively, and X, Y, Z are the XYZ data of the input image in the XYZ space, and $X_0=95.04$, $Y_0=100$, $Z_0=108.89$, and $L_1$ indicates luminance in Luv space, and u and v indicate chroma in the Luv space.

Step S205, converting the Luv data into LCH data in the LCH space.

Specifically, the Luv data may be converted into the LCH data of the LCH space by following formulas, so as to be obtained color saturation $c_{in}$ of each pixel:

$L=L_1$;

$c_{in}=(u+v)^{1/2}$;

$h=\arctan(v/u)$;

wherein $L_1$ indicates luminance in the Luv space, L indicates luminance in the LCH space, and the value of luminance L and the value of the luminance $L_1$ in the Luv space remain unchanged, h indicates hue in the LCH space, and $c_{in}$ indicates color saturation in the LCH space.

In this embodiment, it is convenient to expand color saturation on the color in the LCH space by converting the input image from the RGB space into the LCH space, so that the color data of the input image after expanding color saturation is acquired.

Furthermore, based on the above-mentioned embodiment shown in FIG. 3 or FIG. 2, step of expanding color saturation on the color data of the color conversion to obtain the expanded color data comprises:

Step S206, determining whether color saturation in the LCH data is greater than a preset threshold.

The value $c_{in}$ of the color saturation of each pixel may be acquired after converting the linear RGB data of the input image into the LCH data of the LCH space. By comparing the color saturation of each pixel with the preset threshold, if the color saturation of the pixel is greater than the preset threshold, then step S207 is executed, and if the color saturation of the pixel is less than or equal to the preset threshold, then step S208 is executed.

Step S207, expanding the color saturation of the input image non-linearly according to the Bézier curve.

Step S208, expanding the color saturation of the input image linearly.

Step S209, acquiring the color saturation in the LCH data after expanding color saturation.

Specifically, the color saturation in the LCH data after color saturation expansion is acquired by following formulas:

$$c_{out} = \begin{cases} \dfrac{kc_{out}}{kc_{in}} c_{in}, & 0 \le c_{in} \le kc_{in} \\ kc_{out} + (1-kc_{out})B_N\left(\dfrac{c_{in}-kc_{in}}{1-kc_{in}}\right), & kc_{in} < c_{in} \le 1 \end{cases};$$

$$B_N = \sum_{i=0}^{N} \binom{N}{k} t^i (1-t)^{N-i} P_i;$$

wherein $kc_{in}$ is a preset threshold, k is a coefficient of linear expansion, $k \ge 1$, $B_N$ is the Bézier curve, $P_i$ is a point on the Bézier curve, $P_i=(P_0, P_1, P_2, \ldots, P_N)$, i is an order of Bézier curve, i is a natural number, $P_0, P_1, P_2, \ldots, P_N$ are determined by a color saturation distribution of the image.

Note that the preset threshold value $kc_{in}$ may be 0.3, 0.4, or 0.5, or set according to the actual situation, which is not specifically limited in this embodiment.

According to the above-mentioned formulas, the correspondence between $c_{in}$ before expanding color saturation and $c_{out}$ after expanding color saturation in the LCH space is shown in FIG. 3. If color saturation of a certain pixel does not exceed the threshold $kc_{in}$, it represents that the color saturation of the pixel is low and is required to be linearly expanded. Here, if the value of k is greater than 1, it represents that the color saturation is linearly expanded. If the value of k is equal to 1, it represents that the color saturation remains unchanged. However, if color saturation of a certain pixel exceeds the threshold $kc_{in}$, the value of the pixel after non-linearly expanding color saturation is calculated according to the Bézier curve $B_N$. Specifically, the color saturation of each pixel in the input image is divided into different levels according to different gradients, and each level is defined as a point $P_i$ on the Bézier curve, for example, when the preset threshold is 0.4, all pixels with color saturation in the range of 0.4 to 0.5 are taken as P1, and all pixels with color saturation in the range of 0.5 to 0.6 are taken as P2, and so on, so as to obtain the point Pi of the entire input image and then calculate the Bézier curve $B_N$ with the point Pi.

In this embodiment, the color saturation is non-linearly expanded if the color saturation exceeds the preset threshold, and the color saturation is linearly expanded if the color saturation is less than or equal to the preset threshold by the above-mentioned method, so that the color saturation of the input image is greatly improved, as a consequence, the processed image looks more vivid.

Figure 5:
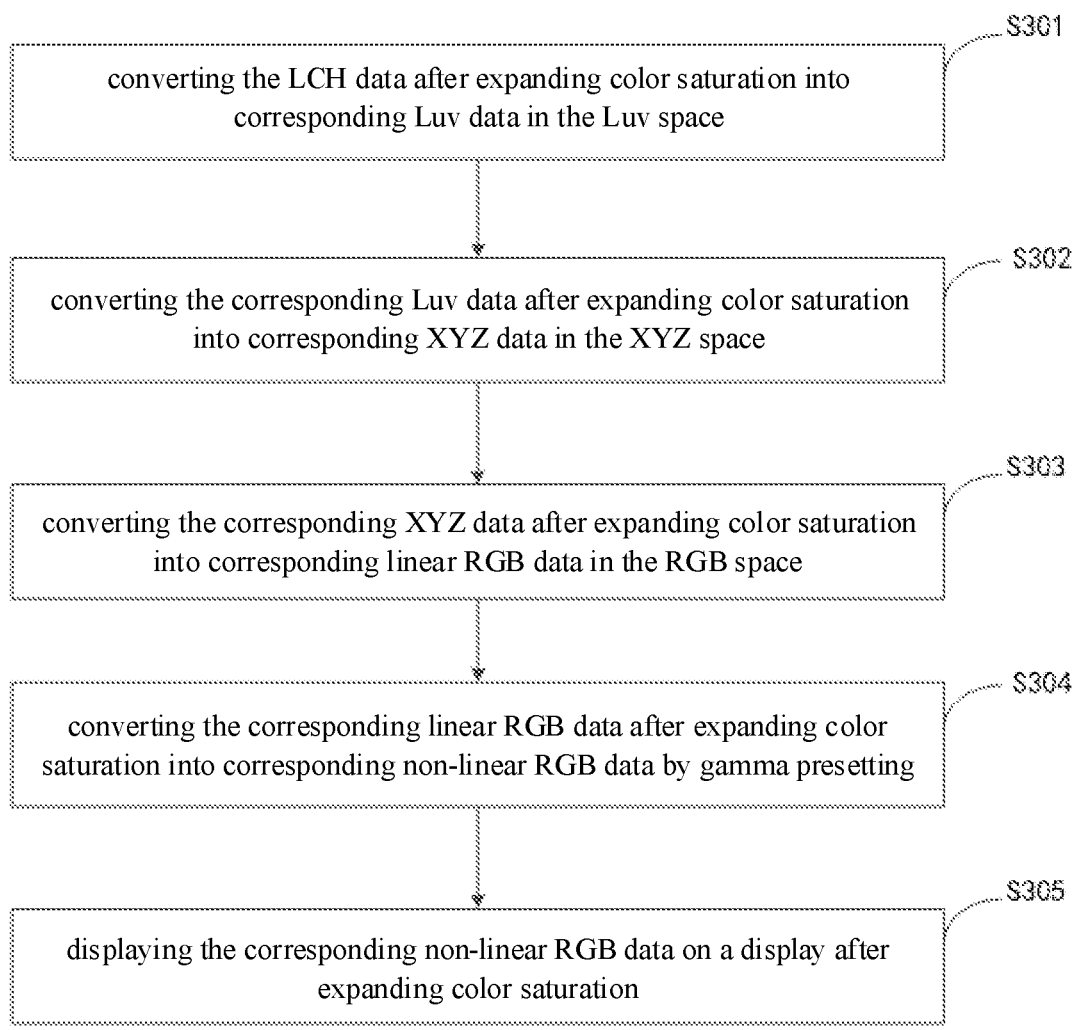
FIG. 5 is a schematic flowchart of a second embodiment of a saturation enhancement method of the present disclosure.

Referring to FIG. 5, FIG. 5 is a schematic flowchart of a second embodiment of the saturation enhancement method of the present disclosure. Based on the embodiment shown in FIG. 2, before the step of performing a gamma-based preprocess on the expanded color data to obtain the processed color data, the method comprises:

Step S301, converting the LCH data after expanding color saturation into corresponding Luv data in the Luv space.

The input image after expanding color saturation is required to be converted from the LCH space to the RGB space after the color saturation is expanded in the LCH space, so as to be displayed on the display. Specifically, there is not any direct conversion formula between LCH data and RGB data, so a channel of an XYZ space is used as an intermediate layer in the process of converting the input image after expanding color saturation from the LCH space into the RGB space. The input image after expanding color saturation is converted from the LCH space into the RGB space, namely, the input image after expanding color saturation is converted from the LCH space into the XYZ space, and then the XYZ space is converted into the RGB space, so as to obtain the RGB data after expanding color saturation.

Specifically, the LCH data after expanding color saturation may be converted into the corresponding Luv data in the Luv space by the following formulas:

$L_2 = L$;

$u_2 = c_{out} \cos h$;

$v_2 = c_{out} \sin h$;

wherein h indicates hue in the LCH space, $c_{out}$ indicates color saturation after expanding color saturation in the LCH space, and $L_2$ indicates brightness after expanding color saturation in the Luv space, and the luminance $L_2$ is same as the luminance $L_1$ in the Luv space, namely, the brightness is unchanged in the different color spaces, $u_2$, $v_2$ indicate chroma after expanding color saturation in the Luv space.

Step S302: converting the corresponding Luv data after expanding color saturation into corresponding XYZ data in the XYZ space.

Specifically, the corresponding Luv data after expanding color saturation may be converted into the corresponding XYZ data in the XYZ space by following formulas:

$u'_0 = 4X_0/(X_0 + 15Y_0 + 3Z_0)$;

$v'_0 = 9Y_0/(X_0 + 15Y_0 + 3Z_0)$;

$Y' = Y_0[(L+16)/116]^3$;

$X' = 9Y'[(u_2/13L) + u'_0]/4[(v_2/13L) + v'_0]$;

$Z' = [52L/3(u_2 + 13Lu'_0) - 1]X' - 5Y'$;

wherein $u_2$ and $v_2$ indicate chroma after expanding color saturation in the Luv space, X', Y', Z' indicate the corresponding XYZ data of the input image after expanding color saturation in the XYZ space, $X_0 = 95.04$, $Y_0 = 100$, $Z_0 = 108.89$.

Step S303: converting the corresponding XYZ data after expanding color saturation into corresponding linear RGB data in the RGB space.

Specifically, the corresponding XYZ data after expanding color saturation may be converted into corresponding linear RGB data in the RGB space by a following formula:

$$\begin{bmatrix} R'_o \\ G'_o \\ B'_o \end{bmatrix} = \begin{bmatrix} 0.3241 & -1.5373 & -0.4986 \\ -0.9692 & 1.8760 & 0.0416 \\ 0.0556 & -0.2040 & 1.0571 \end{bmatrix} \begin{bmatrix} X' \\ Y' \\ Z' \end{bmatrix};$$

wherein X', Y', Z' indicate corresponding XYZ data of the input image after expanding color saturation in the XYZ space, $R_o'$, $G_o'$, $B_o'$ indicate linearized RGB data of the input image after expanding color saturation in the RGB space.

Furthermore, the step of performing the gamma-based preprocess on the expanded color data to obtain the processed color data further comprises:

Step S304, converting the corresponding linear RGB data after expanding color saturation into corresponding non-linear RGB data by gamma presetting.

If the RGB data is linear RGB data, the expanded linear RGB data is required to be converted into expanded non-linear RGB data by gamma presetting, wherein the value of R indicates red, the value of G indicates green, and the value of B indicates blue. If the RGB data is non-linear RGB data, this step is skipped and the non-linear RGB data is directly displayed.

Specifically, the corresponding linear RGB data after expanding color saturation may be converted into the corresponding non-linear RGB data by gamma presetting by the following formulas:

$R_o = (2^n - 1)R_o'^{1/\gamma}$;

$G_o = (2^n - 1)G_o'^{1/\gamma}$;

$B_o = (2^n - 1)B_o'^{1/\gamma}$;

wherein n indicates a number of bits of RGB data, $\gamma$ indicates a preset gamma value, $R_o'$, $G_o'$, $B_o'$ are linearization values of RGB data of the input image after expanding color saturation in the RGB space, $R_o$, $G_o$, $B_o$ are non-linearization values of RGB data of the input image after expanding color saturation in the RGB space.

It should be noted that the number of bits n of the RGB data may be 8, or may be other values than 8, such as 9, 10, etc., which is not specifically limited in this embodiment. The preset gamma value $\gamma$ may be 2.2 or 2.4. According to the above-mentioned formula, the linear data in the RGB space may be converted into non-linear data.

Step S305, displaying the corresponding non-linear RGB data on a display after expanding color saturation.

The corresponding non-linear RGB data of the input image may be displayed on the display for viewing by the users after the non-linear RGB data after expanding color saturation is acquired.

In this embodiment, the input image after expanding color saturation is converted from the LCH space to the RGB space, and the non-linear RGB after expanding color saturation is acquired, so that the input image after expanding color saturation is displayed, as a consequence, the image displayed on the display looks more vivid.

In addition, a computer readable storage medium is also provided in an embodiment of the present disclosure, where a program for enhancing color saturation is stored on a computer-readable storage medium, and the program for enhancing color saturation is executed by a processor to implement the following operations:

converting a color space of an input image to obtain color data of color conversion;

expanding color saturation on the color data of the color conversion to obtain the expanded color data;

performing a gamma-based preprocess on the expanded color data to obtain the processed color data.

Furthermore, following operations are also implemented when the program for enhancing color saturation is executed by the processor:

acquiring RGB data of each pixel in an RGB space of the input image;

normalizing the RGB data and performing gamma correction on the normalized RGB data to obtain linear RGB data of the input image; and converting the linear RGB data of the input image into LCH data in an LCH space.

Furthermore, following operations are also implemented when the program for enhancing color saturation is executed by the processor:

normalizing the RGB data according to a number of bits of the RGB data;

performing gamma correction on the normalized RGB data according to a preset gamma value to obtain the linear RGB data of the input image.

Furthermore, following operations are also implemented when the program for enhancing color saturation is executed by the processor:

converting the linear RGB data of the input image into XYZ data in an XYZ space;

converting the XYZ data into Luv data in a Luv space;

converting the Luv data into LCH data in the LCH space.

Furthermore, following operations are also implemented when the program for enhancing color saturation is executed by the processor:

determining whether color saturation in the LCH data is greater than a preset threshold;

if yes, expanding the color saturation of the input image non-linearly according to the Bézier curve;

if no, expanding the color saturation of the input image linearly;

acquiring the color saturation in the LCH data after expanding color saturation.

Furthermore, following operations are also implemented when the program for enhancing color saturation is executed by the processor:

acquiring the color saturation in the LCH data after expanding color saturation by following formulas:

$$c_{out} = \begin{cases} \dfrac{kc_{out}}{kc_{in}} c_{in}, & 0 \leq c_{in} \leq kc_{in} \\ kc_{out} + (1 - kc_{out})B_N\left(\dfrac{c_{in} - kc_{in}}{1 - kc_{in}}\right), & kc_{in} < c_{in} \leq 1 \end{cases};$$

$$B_N = \sum_{i=0}^{N} \binom{N}{k} t^i (1-t)^{N-i} P_i;$$

wherein $kc_{in}$ is a preset threshold, k is a coefficient of linear expansion, k≥1, $B_N$ is the Bézier curve, $P_i$ is a point on the Bézier curve, $P_i=(P_0, P_1, P_2, \ldots, P_N)$, i is an order of the Bézier curve, i is a natural number, $P_0, P_1, P_2, \ldots, P_N$ are determined by a color saturation distribution of an image.

Furthermore, following operations are also implemented when the program for enhancing color saturation is executed by the processor:

converting the LCH data after expanding color saturation into corresponding Luv data in the Luv space;

converting the corresponding Luv data after expanding color saturation into corresponding XYZ data in the XYZ space;

converting the corresponding XYZ data after expanding color saturation into corresponding linear RGB data in the RGB space.

Furthermore, following operations are also implemented when the program for enhancing color saturation is executed by the processor:

converting the corresponding linear RGB data after expanding color saturation into corresponding non-linear RGB data by gamma presetting; and displaying the corresponding non-linear RGB data on a display after expanding color saturation.

The specific embodiments of the computer-readable storage medium of the present disclosure are basically same as the above-mentioned embodiments of the method for enhancing color saturation, which are not further described in detail here.

It should be noted that, herein, the terms "include", "comprise", or their any other variant is intended to cover a non-exclusive inclusion, so that a process, a method, an article, or a system that includes a list of elements not only includes those elements, but also includes other elements that are not expressly listed, or further includes elements inherent to such a process, method, article, or system. An element preceded by "includes a . . . " does not, without more constraints, preclude the presence of additional identical elements in the process, method, article, or system that includes the element.

In addition, the serial numbers of the foregoing embodiments of the present disclosure are used simply for illustrative purposes and are not to be construed as indicating or implicitly indicating the advantages and disadvantages of the embodiments.

Based on the foregoing description of the embodiments, a person skilled in the art may clearly understand that the present disclosure may be implemented by software in addition to a necessary universal hardware platform or by hardware only. In most circumstances, the former is a preferred implementation manner. Based on such an understanding, the technical solution of the present disclosure essentially or the part contributing to the prior art may be implemented in a form of a software product. The software product may be stored in a storage medium (such as a ROM/RAM, a magnetic disk, or an optical disc), and includes several instructions for instructing a computer device (which may be a mobile phone, a personal computer, a server, or a network device) to perform the methods described in the embodiments or some parts of the embodiments of the present disclosure.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. A saturation enhancement method performed by a display device comprising a processor, wherein the saturation enhancement method comprises:
   converting, by the processor of the display device, a color space of an input image to obtain color data of color conversion;
   expanding, by the processor of the display device, color saturation on the color data of the color conversion to obtain an expanded color data;
   performing, by the processor of the display device, a gamma-based preprocess on the expanded color data to obtain a processed color data;
   wherein the step of converting the color space of the input image to obtain the color data of the color conversion comprises:
   acquiring, by the processor of the display device, RGB data of each pixel in an RGB space of the input image;
   normalizing, by the processor of the display device, the RGB data and performing, by the processor of the display device, gamma correction on a normalized RGB data to obtain linear RGB data of the input image; and
   converting, by the processor of the display device, the linear RGB data of the input image into LCH data in an LCH space;
   wherein the step of converting the linear RGB data of the input image into the LCH data in the LCH space comprises:
   converting, by the processor of the display device, the linear RGB data of the input image into XYZ data in an XYZ space;
   converting, by the processor of the display device, the XYZ data into Luv data in a Luv space;
   converting, by the processor of the display device, the Luv data into the LCH data in the LCH space.

2. The saturation enhancement method of claim 1, wherein the step of normalizing the RGB data and performing gamma correction on the normalized RGB data to obtain the linear RGB data of the input image comprises:
   normalizing, by the processor of the display device, the RGB data according to a number of bits of the RGB data;
   performing, by the processor of the display device, gamma correction on the normalized RGB data according to a preset gamma value to obtain the linear RGB data of the input image.

3. The saturation enhancement method of claim 1, wherein the RGB data is normalized by following formulas:

$$R_1 = \frac{R}{2^n - 1};$$

$$G_1 = \frac{G}{2^n - 1};$$

$$B_1 = \frac{B}{2^n - 1};$$

wherein n indicates a number of bits of the RGB data; R, G, and B indicate the RGB data of the input image in the RGB space, respectively; and $R_1$, $G_1$, and $B_1$ are normalized values of R, G, and B, respectively.

4. The saturation enhancement method of claim 1, wherein the gamma correction is performed on the normalized RGB data by following formulas:

$$R' = (R_1)^\gamma;$$

$$G' = (G_1)^\gamma;$$

$$B' = (B_1)^\gamma;$$

wherein n indicates a number of bits of RGB data; $\gamma$ indicates a preset gamma value; $R_1$, $G_1$, and $B_1$ are normalized values of R, G, and B, respectively; and R', G', B' are linearization values of R, G and B, respectively.

5. The saturation enhancement method of claim 1, wherein the step of expanding color saturation on the color data of the color conversion to obtain the expanded color data comprises:
   determining, by the processor of the display device, whether color saturation in the LCH data is greater than a preset threshold;
   if yes, expanding, by the processor of the display device, the color saturation of the input image non-linearly according to a Bézier curve;
   if no, expanding, by the processor of the display device, the color saturation of the input image linearly;
   acquiring, by the processor of the display device, the color saturation in the LCH data after expanding color saturation.

6. The saturation enhancement method of claim 5, wherein the color saturation in the LCH data after expanding color saturation is acquired by following formulas:

$$c_{out} = \begin{cases} \frac{kc_{out}}{kc_{in}} c_{in}, & 0 \le c_{in} \le kc_{in} \\ kc_{out} + (1 - kc_{out})B_N\left(\frac{c_{in} - kc_{in}}{1 - kc_{in}}\right), & kc_{in} < c_{in} \le 1 \end{cases};$$

$$B_N = \sum_{i=0}^{N} \binom{N}{k} t^i (1-t)^{N-i} P_i;$$

wherein $kc_{in}$ is a preset threshold, k is a coefficient of linear expansion, k≥1; $B_N$ is the Bézier curve; $P_i$ is a point on the Bézier curve; $P_i = (P_0, P_1, P_2, \ldots, P_N)$; i is an order of the Bézier curve; i is a natural number; $P_0$, $P_1$, $P_2$, ..., $P_N$ are determined by a color saturation distribution of an image.

7. The saturation enhancement method of claim 1, wherein before the step of performing the gamma-based preprocess on the expanded color data to obtain the processed color data, the method further comprises:

converting, by the processor of the display device, an LCH data after expanding color saturation into corresponding Luv data in a Luv space;

converting, by the processor of the display device, the corresponding Luv data after expanding color saturation into corresponding XYZ data in an XYZ space;

converting, by the processor of the display device, the corresponding XYZ data after expanding color saturation into corresponding linear RGB data in an RGB space.

8. The saturation enhancement method of claim 7, wherein the step of performing the gamma-based preprocess on the expanded color data to obtain the processed color data comprises:

converting, by the processor of the display device, the corresponding linear RGB data after expanding color saturation into corresponding non-linear RGB data by gamma presetting; and displaying, by the processor of the display device, the corresponding non-linear RGB data on a display after expanding color saturation.

9. The saturation enhancement method of claim 7, wherein the LCH data after expanding color saturation is converted into the corresponding Luv data in the Luv space by following formulas:

$L_2 = L;$ $u_2 = c_{out} \cos h;$ $v_2 = c_{out} \sin h;$ wherein h indicates hue in an LCH space, $c_{out}$ indicates color saturation after expanding color saturation in the LCH space, and $L_2$ indicates brightness after expanding color saturation in the Luv space.

10. The saturation enhancement method of claim 7, wherein the corresponding Luv data after expanding color saturation may be converted into the corresponding XYZ data in the XYZ space by the following formulas:

$u'_0 = 4X_0/(X_0 + 15Y_0 + 3Z_0);$ $v'_0 = 9Y_0/(X_0 + 15Y_0 + 3Z_0);$ $Y' = Y_0[(L+16)/116]^3;$ $X' = 9Y'[(u_2/13L) + u'_0]/4[(v_2/13L) + V'_0];$ $Z' = [52L/3(u_2 + 13Lu_0') - 1]X' - 5Y';$ wherein $u_2$ and $v_2$ indicate chroma after expanding color saturation in the Luv space; and X', Y', Z' indicate the corresponding XYZ data of the input image after expanding color saturation in the XYZ space.

11. The saturation enhancement method of claim 7, wherein the corresponding XYZ data after expanding color saturation may be converted into corresponding linear RGB data in the RGB space by following formulas:

$$\begin{bmatrix} R'_o \\ G'_o \\ B'_o \end{bmatrix} = \begin{bmatrix} 0.3241 & -1.5373 & -0.4986 \\ -0.9692 & 1.8760 & 0.0416 \\ 0.0556 & -0.2040 & 1.0571 \end{bmatrix} \begin{bmatrix} X' \\ Y' \\ Z' \end{bmatrix};$$

wherein X', Y', Z' indicate corresponding XYZ data of the input image after expanding color saturation in the XYZ space, and $R_o'$, $G_o'$, $B_o'$ indicate linearized RGB data of the input image after expanding color saturation in the RGB space.

12. A display device, wherein the display device comprises: a memory, a processor, and a program for enhancing color saturation stored on the memory and executed by the processor, the steps of the saturation enhancement method of claim 1 are implemented when the program for enhancing color saturation is executed by the processor.

13. A saturation enhancement method performed by a processor of a display device, wherein the saturation enhancement method comprises:

converting, by the processor of the display device, a color space of an input image to obtain color data of color conversion;

expanding, by the processor of the display device, color saturation on the color data of the color conversion to obtain an expanded color data;

performing, by the processor of the display device, a gamma-based preprocess on the expanded color data to obtain a processed color data;

wherein before the step of performing the gamma-based preprocess on the expanded color data to obtain the processed color data, the method further comprises:

converting, by the processor of the display device, an LCH data after expanding color saturation into corresponding Luv data in a Luv space;

converting, by the processor of the display device, the corresponding Luv data after expanding color saturation into corresponding XYZ data in an XYZ space;

converting, by the processor of the display device, the corresponding XYZ data after expanding color saturation into corresponding linear RGB data in an RGB space.

14. The saturation enhancement method of claim 13, wherein the step of converting the color space of the input image to obtain the color data of the color conversion comprises:

acquiring, by the processor of the display device, RGB data of each pixel in an RGB space of the input image;

normalizing, by the processor of the display device, the RGB data and performing gamma correction on a normalized RGB data to obtain linear RGB data of the input image; and converting, by the processor of the display device, the linear RGB data of the input image into LCH data in an LCH space.

15. The saturation enhancement method of claim 14, wherein the step of normalizing the RGB data and performing gamma correction on the normalized RGB data to obtain the linear RGB data of the input image comprises:

normalizing, by the processor of the display device, the RGB data according to a number of bits of the RGB data;

performing, by the processor of the display device, gamma correction on the normalized RGB data according to a preset gamma value to obtain the linear RGB data of the input image.

16. The saturation enhancement method of claim 14, wherein the RGB data is normalized by following formulas:

$$R_1 = \frac{R}{2^n - 1};$$

$$G_1 = \frac{G}{2^n - 1};$$

$$B_1 = \frac{B}{2^n - 1};$$

wherein n indicates a number of bits of the RGB data; R, G, and B indicate the RGB data of the input image in the RGB space, respectively; and $R_1$, $G_1$, and $B_1$ are normalized values of R, G, and B, respectively.

17. The saturation enhancement method of claim 14, wherein the gamma correction is performed on the normalized RGB data by following formulas:

$$R'=(R_1)^\gamma;$$

$$G'=(G_1)^\gamma;$$

$$B'=(B_1)^\gamma;$$

wherein n indicates a number of bits of RGB data; $\gamma$ indicates a preset gamma value; $R_1$, $G_1$, and $B_1$ are normalized values of R, G, and B, respectively; and R', G', B' are linearization values of R, G and B, respectively.

18. The saturation enhancement method of claim 14, wherein the step of converting the linear RGB data of the input image into the LCH data in the LCH space comprises:

converting, by the processor of the display device, the linear RGB data of the input image into XYZ data in an XYZ space;

converting, by the processor of the display device, the XYZ data into Luv data in a Luv space;

converting, by the processor of the display device, the Luv data into the LCH data in the LCH space.

19. The saturation enhancement method of claim 18, wherein the step of expanding color saturation on the color data of the color conversion to obtain the expanded color data comprises:

determining, by the processor of the display device, whether color saturation in the LCH data is greater than a preset threshold;

if yes, expanding, by the processor of the display device, the color saturation of the input image non-linearly according to a Bézier curve;

if no, expanding, by the processor of the display device, the color saturation of the input image linearly;

acquiring, by the processor of the display device, the color saturation in the LCH data after expanding color saturation.

20. The saturation enhancement method of claim 19, wherein the color saturation in the LCH data after expanding color saturation is acquired by following formulas:

$$c_{out} = \begin{cases} \dfrac{kc_{out}}{kc_{in}}c_{in}, & 0 \le c_{in} \le kc_{in} \\ kc_{out} + (1 - kc_{out})B_N\left(\dfrac{c_{in} - kc_{in}}{1 - kc_{in}}\right), & kc_{in} < c_{in} \le 1 \end{cases};$$

$$B_N = \sum_{i=0}^{N}\binom{N}{k} t^i (1-t)^{N-i} P_i;$$

wherein $kc_{in}$ is a preset threshold, k is a coefficient of linear expansion, k≥1; $B_N$ is the Bézier curve; $P_i$ is a point on the Bézier curve; $P_i=(P_0, P_1, P_2, \ldots, P_N)$; i is an order of the Bézier curve; i is a natural number; $P_0$, $P_1$, $P_2$, ..., $P_N$ are determined by a color saturation distribution of an image.

\* \* \* \* \*